United States Patent
Wagner et al.

[19]

[11] Patent Number: 6,032,349
[45] Date of Patent: Mar. 7, 2000

[54] ALIGNMENT COUPLING AND METHOD

[75] Inventors: Valerie J. Wagner, Clemson; Marvin Raymond Hart, Jr., Pickens, both of S.C.

[73] Assignee: Compact Air Products, Inc., Westminster, S.C.

[21] Appl. No.: 09/096,423

[22] Filed: Jun. 11, 1998

[51] Int. Cl.[7] ............................................. F16B 21/10
[52] U.S. Cl. ..................... 29/464; 92/140; 403/331; 403/372; 403/228
[58] Field of Search .................... 403/31, 383, 372, 403/331, 360, 381, 220, 225, 227, 228; 92/140; 29/464, 466

[56] References Cited

U.S. PATENT DOCUMENTS

| | | | |
|---|---|---|---|
| 3,431,824 | 3/1969 | Damm | 92/140 |
| 3,654,581 | 4/1972 | Franz, Jr. | 403/353 X |
| 4,637,193 | 1/1987 | Lange | 403/381 X |
| 4,645,373 | 2/1987 | Purdy | 403/381 X |
| 5,135,329 | 8/1992 | Yuda | 403/360 |
| 5,634,486 | 6/1997 | Hatting et al. | 403/383 X |

*Primary Examiner*—Lynne H. Browne
*Assistant Examiner*—John R. Cottingham
*Attorney, Agent, or Firm*—Ralph Bailey, P.A.

[57] ABSTRACT

An alignment coupling and method of joining an extensible member of a linear actuator to an actuated member for moving a load utilize an enlarged coupler (A) carried by the extensible member within a receptacle in the actuated member formed by a transverse surface (B) and a longitudinal surface (C). A floating alignment is provided by a compressible resilient retaining member (D) permitting limited axial and radial adjustment of the extensible member. The receptacle has an open passageway for insertion of the coupler to facilitate assembly of the components thus providing a foreshortened alignment coupling.

13 Claims, 8 Drawing Sheets

ALIGNMENT COUPLING AND METHOD

BACKGROUND OF INVENTION

This invention relates to a improved alignment coupling and method for joining an extensible member to an actuated member providing a floating alignment and easy assembly of the simplified components within a receptacle having a receiving passageway in the actuated member.

The prior art is represented by U.S. Pat. No. 5,135,329 directed to an alignment coupler for use with a pneumatic linear actuator wherein a piston rod is secured to a coupler which is in turn fastened to an actuated member for moving an external load. The coupler is fastened to a threaded member having a conical surface carried in a tapered bore for permitting axial adjustment. Radial adjustment is provided by a flange on the coupler body which is slidably carried within high density polyethylene rings within a chamber. Since the piston rod must be attached through the coupler which in turn has a threaded member projecting therethrough for attachment to the actuated member, a separate thickness of material is required to accommodate the conical threaded member to permit axial adjustment. The patent further typifies the prior art in that assembly is complicated, requiring a number of separate precision-made parts which must be assembled and confined within a cylindrical seat as by a snap ring which is carried in a groove machined in the cylindrical wall of the seat. The prior art is further exemplified by U.S. Pat. Nos. 5,113,746, 5,440,971, 5,560,729 and 5,634,486.

Another prior art device utilizes a coupler with an intermediate circumferential groove creating a dumbbell-like shape. A U-shaped slot in an actuated member defines a web received within the groove. A very close tolerance must be achieved, otherwise a tapping action results from excessive backlash between the two members when the cylinder is cycled.

Since linear actuators such as pneumatic actuators of the prior art must be capable of use for millions of cycles, alignment of the piston rods with associated components is of paramount importance. Any substantial misalignment results in excessive wear, destroying the useful life of the linear actuator. Loose connections and noisy operation are additional disadvantages common to the prior art.

SUMMARY OF INVENTION

Accordingly, it is an important object of the present invention to provide a simplified alignment coupler and method of installation which will avoid the use of many precision parts and which will afford a tighter fitting assembly of components.

Another important object of the invention is the position of an alignment coupler which is shorter in length providing for a miniaturization of parts as would make it especially useful in robotics and in other sequential operations requiring parts of reduced size such as switching assemblies for use in communications equipment.

Still another important object of the invention is to provide a construction wherein simplified components may be readily assembled producing superior abilities to align both axially and radially by a floating coupling provided through the use of wedging material carried within a slot which is oversized in relation to a coupler carried on a free end of an extensible member.

The prior art extensible members utilized in linear actuators develop alignment problems which result in scoring and galling as a result of even slight misalignments. The floating coupler afforded by the apparatus and method of invention insures proper alignment, greatly increasing the life of the linear actuator.

Another important object is the noise reduction by reducing shock in linear actuator through use of cushioning members which are preferably compressible.

While the alignment coupler and method of the invention described in connection with a particular linear actuator, the simplified components of the invention find usefulness in coupling any extensible member to another member to facilitate movement. Likewise, a linear actuator of any variety may be utilized. While the invention is especially useful in connection with pneumatic linear actuators because of alignment problems associated with the piston rods, it is apparent that the invention may also be effectively utilized with other linear actuators and the like.

These and other objects of the invention by providing a transverse receptacle in a member actuated by a linear actuator for receiving an enlarged coupler together with a retaining member positioning the coupler in floating alignment permitting axial and radial adjustment. The invention also contemplates insisting the enlarged coupler into a passageway for lateral insertion into the receptacle as through a passageway opening at the rear of the actuated member.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an alignment coupling for joining a linear actuator having an extensible member to an actuated member for moving an external load. The coupling includes a coupler A attached to the extensible member. The coupler has a circumferential or marginal surface which is preferably arcuate. A transverse slot or receptacle is provided in the actuated member for receiving and retaining the coupler against dislodgement therefrom. The transverse slot has at least one surface B defining a depth greater than a depth of the coupler for axial adjustment of the coupling as by tilting the coupler. A circumferential surface C defines a width in excess of a width of the arcuate circumferential surface to permit a radial adjustment facilitating longitudinal alignment of the coupler. A retaining member D is positioned in the slot for exerting a force between the coupler and an opposed surface tending to position the coupler in operating alignment for moving the load.

Thus, the space provided by an oversized receptacle, as between spaced opposed surfaces B, permits a tilting or rocking action providing axial alignment of a longitudinal axis of the extensible member and the coupler. The excess width provided by the circumferential surface or surfaces C permits radial adjustment of the longitudinal axis. The retaining member D, which is preferably compressible and resilient, provides a floating action to the coupler A. The floating action tends to bring the coupler and the linear actuator into proper alignment and to retain them in proper position during operation by reason of resulting force components tending to axial and radial alignment. Because the components are contained within the slot, it is not necessary to add to the length dimension of the extensible member for making connection to an actuated member. This would result in a lengthened alignment coupling as known to the prior art as illustrated, for example, in U.S. Pat. No. 5,135,329. Thus, a foreshortened coupling is provided by the apparatus and method of the invention.

Figure 1:
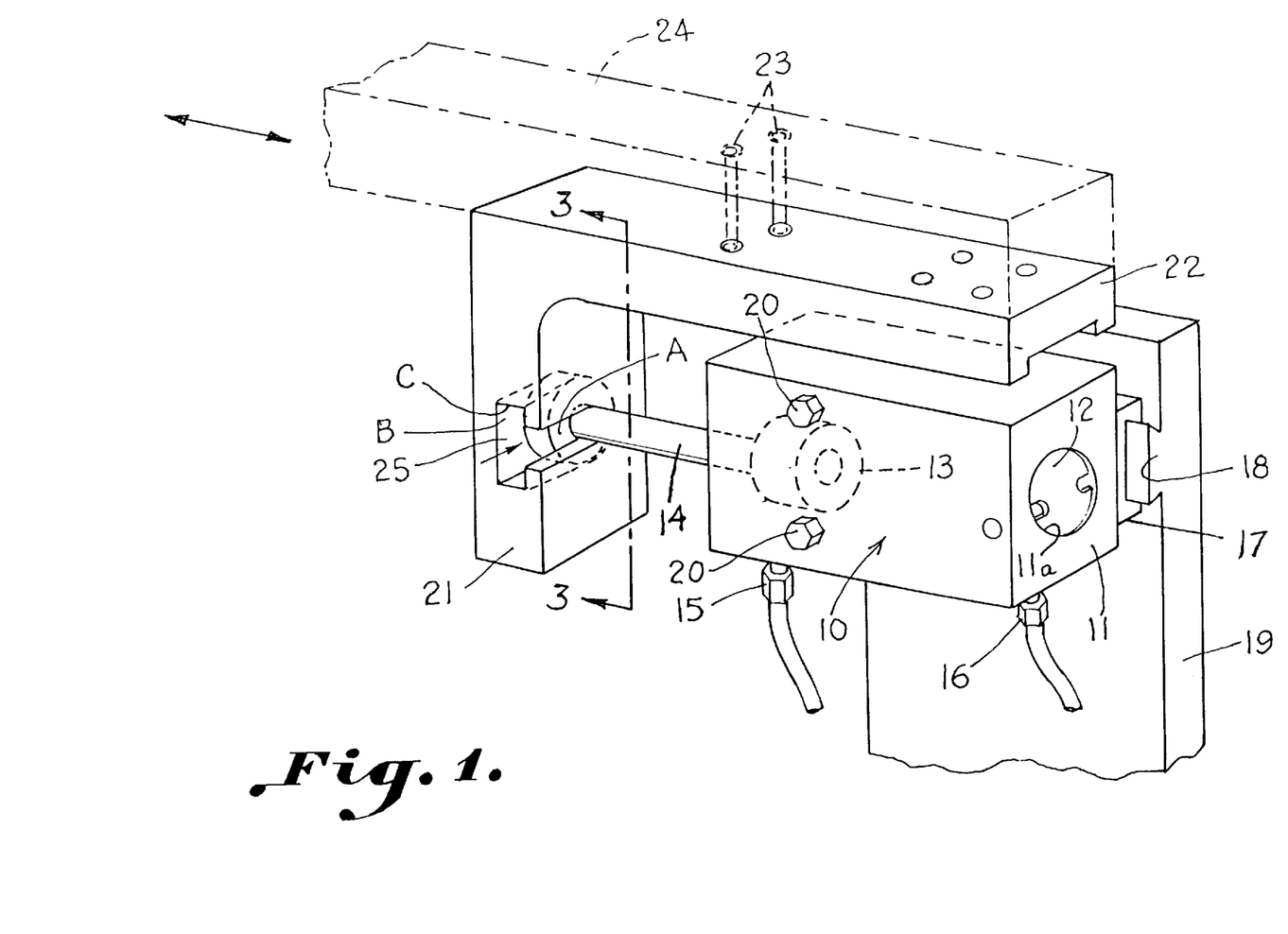
FIG. 1 is a left rear perspective view illustrating a pneumatic linear actuator with extensible member joined to an actuated member utilizing an alignment coupling and method in accordance with the invention for operations in moving an external load.

Now referring more particularly to the drawings, FIG. 1 illustrates a housing of a linear actuator broadly designated at 10. The linear actuator housing contains a source of power that includes a cylinder 11 containing a bore 11a which is closed at one end by an end cap 12. Within the cylinder a piston 13 carries an extensible member in the form of piston rod 14. Fixtures 15 and 16 are illustrated for connection to an air supply (not shown) for operating the pneumatic linear actuator. The cylinder has a bracket 17 for connection to a complementary bracket member 18 carried by a fixed member 19 to which the linear actuator is fixedly mounted. The bolts 20 secure the cylinder and the brackets completing the mounting connection to the stationary member 19.

An actuated member is illustrated in FIG. 1 as including an upright member 21 being integrally joined to a horizontal rearwardly extending component 22. The actuated member has connection as by threaded fasteners 23 to an external load schematically illustrated at 24.

Figure 2:
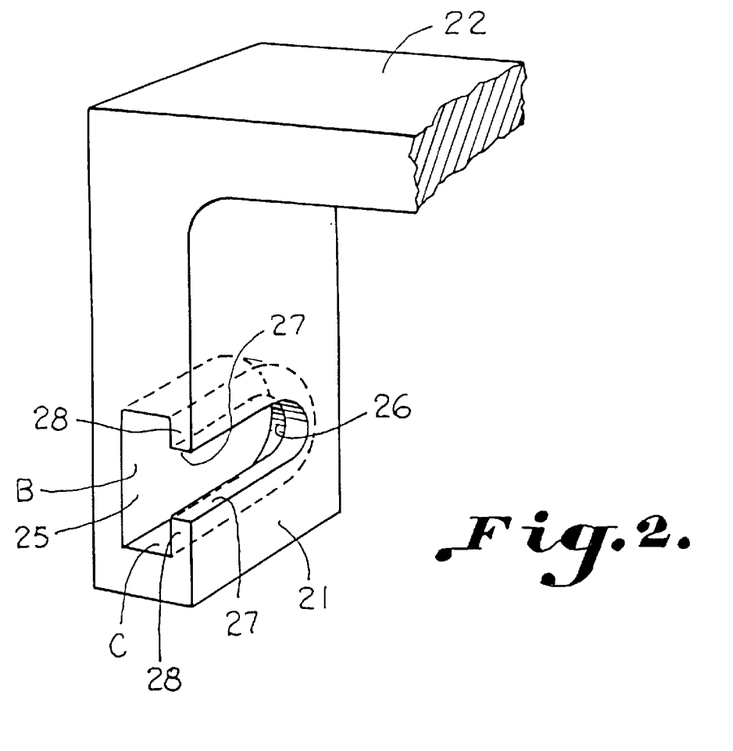
FIG. 2 is an enlarged perspective view illustrating a slot within the actuated member for carrying a coupling constructed in accordance with the invention.
Figure 3:
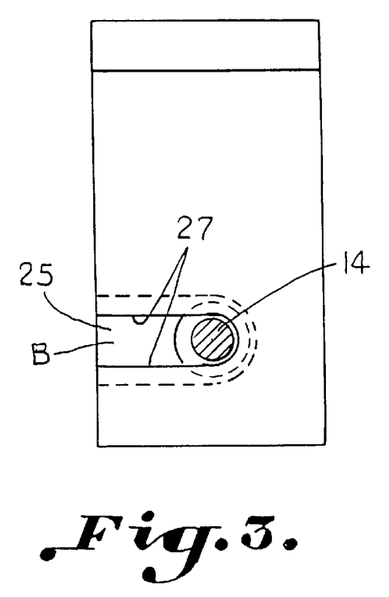
FIG. 3 is a sectional elevation taken on the line 3—3 in FIG. 1 illustrating the positioning of the piston rod and a coupler carried thereby in a transverse slot.

The upright component 21 of the actuated member receives the coupler A in a transverse slot or receptacle formed by the spaced opposed surface B and by the complimentary circumferential surfaces C. The transverse slot extends laterally opening on one end forming a passageway 25. The complimentary surfaces C are joined by a U-shaped end portion 26 best illustrated in FIG. 2. The slot need not be closed on one end as illustrated by 26 but may extend entirely across the vertical component 21 of the actuated member. The slot 25 is generally rectangular in cross section and is illustrated as being positioned generally vertically in FIGS. 1–3. Slot 25 is further defined by an opening formed between opposing surfaces 27. The opening between the opposed surfaces 27 form depending opposed flanges 28 for retaining the coupler A within the receptacle provided in the slot. While providing sufficient space for movement of the extensible member 14 at right angles to the surfaces 27 to permit floating alignment.

Figure 4:
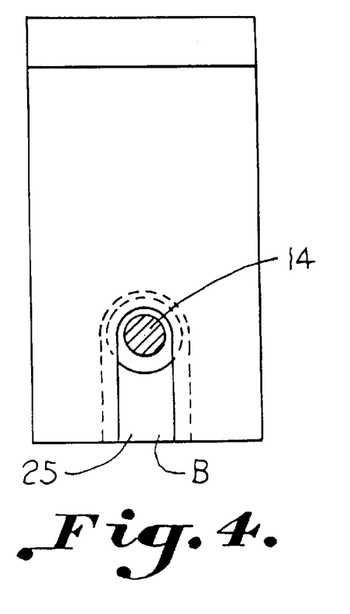
FIG. 4 is a front elevation similar to FIG. 3 illustrating an embodiment wherein the slot opens at a lower inner edge of the actuated member.
Figures 5, 6:
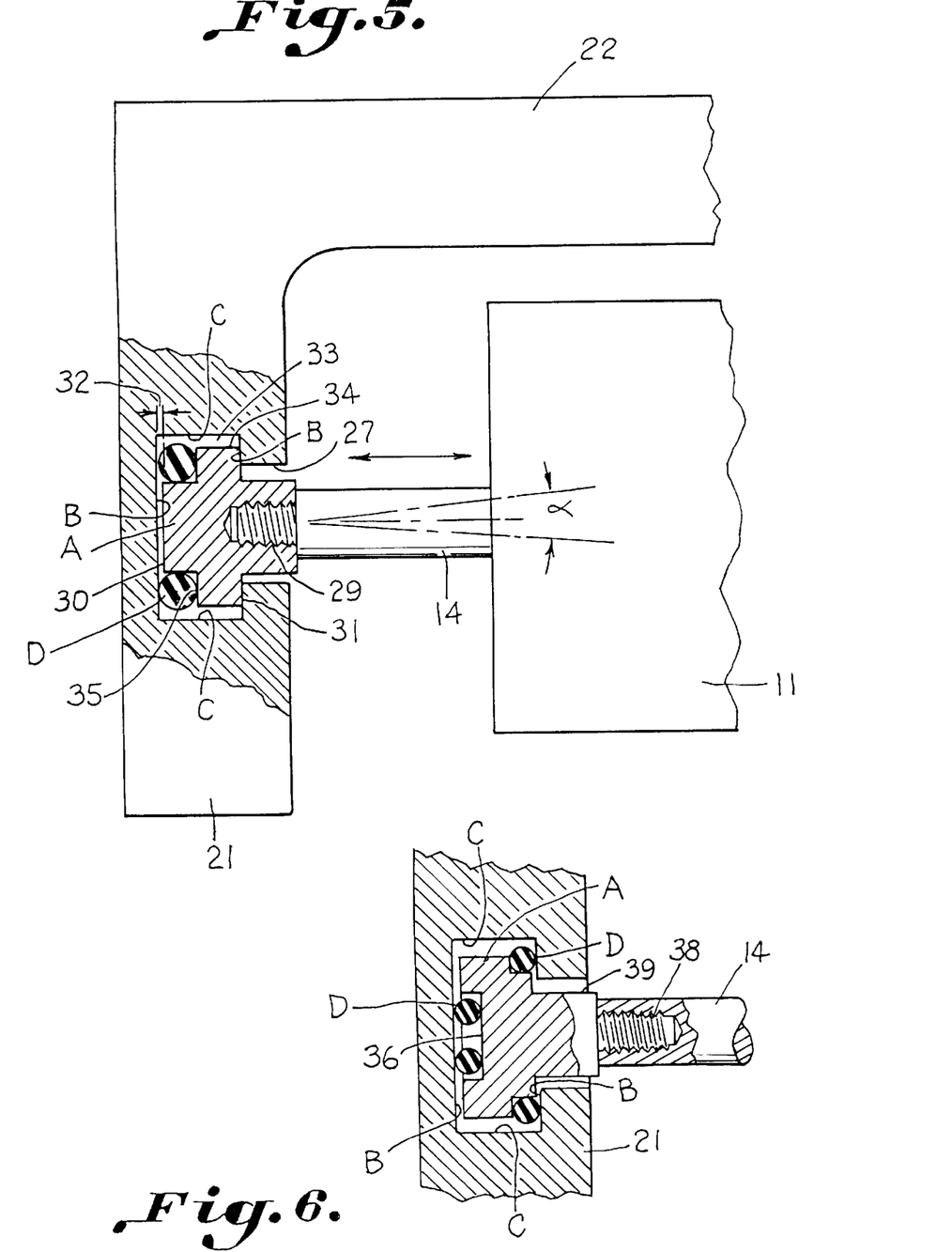
FIG. 5 is an enlarged side elevation, with parts broken away and parts in section, illustrating a coupling constructed in accordance with the present invention together with components defining the transverse slot or receptacle containing a coupler and retaining member for floating alignment.
FIG. 6 is a sectional elevation similar to FIG. 5 illustrating a modified form of the invention with retaining members in the form of O-rings which are contained within grooves on opposite ends of the coupler.

FIG. 4 shows the slot 25 formed by the opposed surfaces B and the complimentary surfaces C as being disposed vertically. It is apparent that the slot may open in any desirable surface of the actuated member to provide the desired alignment for connection to the extensible member 14. FIG. 5 further illustrates the coupler A illustrated in FIG. 1. The coupler has a threaded connection as at 29 with the piston rod 14. The coupler has an enlarged portion with end surfaces 30 and 31 so as to provide a space best illustrated at 32 in FIG. 5. A marginal space is also illustrated at 33 between a circumferential or marginal surface 34 of the coupler and the complimentary surfaces C. The spaces 32 and 33 provide room within the receptacle for tilting of the longitudinal axis of the coupler and piston rod as illustrated by the angle α in FIG. 5. Radial adjustments of the longitudinal axis may be made by movements of the coupler A in any direction within the space 33. A recess is formed by a circular groove 35 within an end portion of the coupler remote from the piston rod 14 for containing a retaining member D which is preferably both resilient and compressible shown in FIG. 5 as a closed circular ring having a circular cross section. The insert or retaining member permits the machining of parts to less critical tolerances than would otherwise be required. This advantage could be achieved, for example, by a metallic ring even though such be neither compressible nor resilient.

The retaining member D may preferably be an O-ring of the usual type which is toroidal or donut in shape and constructed of a suitable synthetic rubbery material compatible with the use of a lubricant therewith. It is evident that O-rings are customarily provided to the trade in a number of configurations usually closed loops which have a variety of cross-sectional shapes and any of these including flat constructions sometimes called flat washers may be utilized. The compressive resilient retaining members D may also be provided in the form of one or more coiled metallic springs which will be referred to in greater detail below. The term O-ring is used herein in the broadest sense of the word.

FIG. 6 illustrates a modified form of the invention wherein a retaining member D is illustrated as being carried at both ends of the coupler A in suitable grooves provided for that purpose. The groove 36 in the remote end of the coupler A may be provided within the adjacent wall portion of the opposed surface B so as to position the retaining member therein instead of the coupler. FIG. 6 further illustrates an external mode of coupling the member A to the piston rod through a threaded extension 38 of externally extending collar 39 of coupler A.

Figure 7:
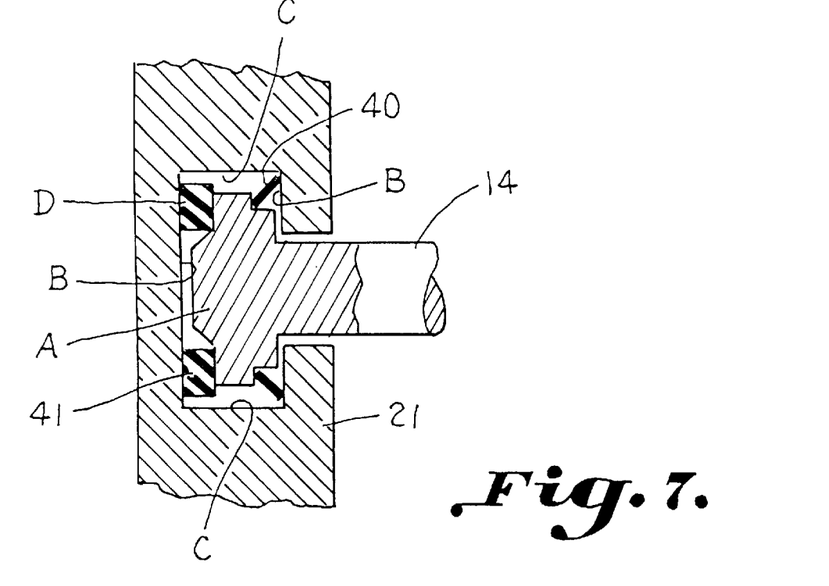
FIG. 7 is a sectional elevation illustrating another modified form of the invention utilizing a flat washer on an end of the coupler remote from the piston rod and a Bellville washer on an end of the coupler adjacent the piston rod.

FIG. 7 illustrates an integral connection between the piston rod 14 and the coupler A. A resilient member in the form of a Bellville washer is illustrated at 40 and a retaining member D in the form of a flat washer is illustrated at 41 at the other end of the coupler. The flat washer is illustrated as being formed of a synthetic rubbery material whereas the compressible resilient washer may be constructed of metal.

Figure 8:
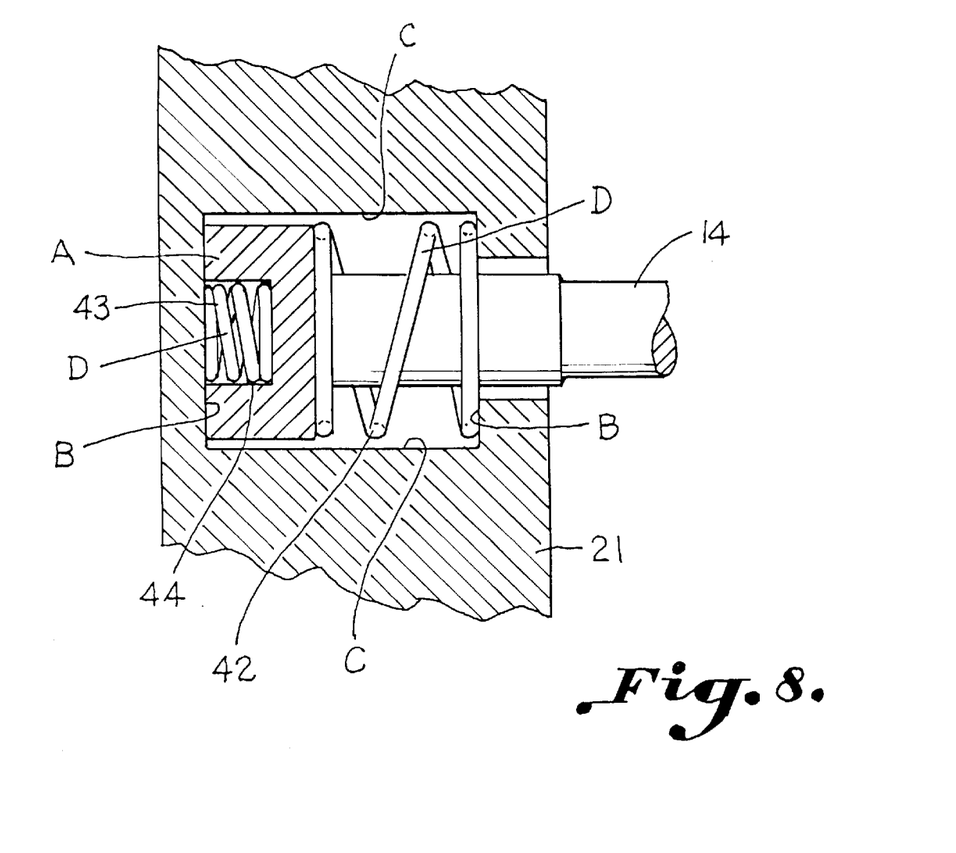
FIG. 8 is a modified form of the invention wherein the retaining member or component is supplied by coiled springs at each end of the coupler.

FIG. 8 illustrates the use of coiled springs 42 and 43 as constituting the retaining members D. The coiled springs are positioned at both ends of the coupler A with a smaller of the springs being carried within the cavity or groove 44 at the remote end of the coupler A.

Figure 9:
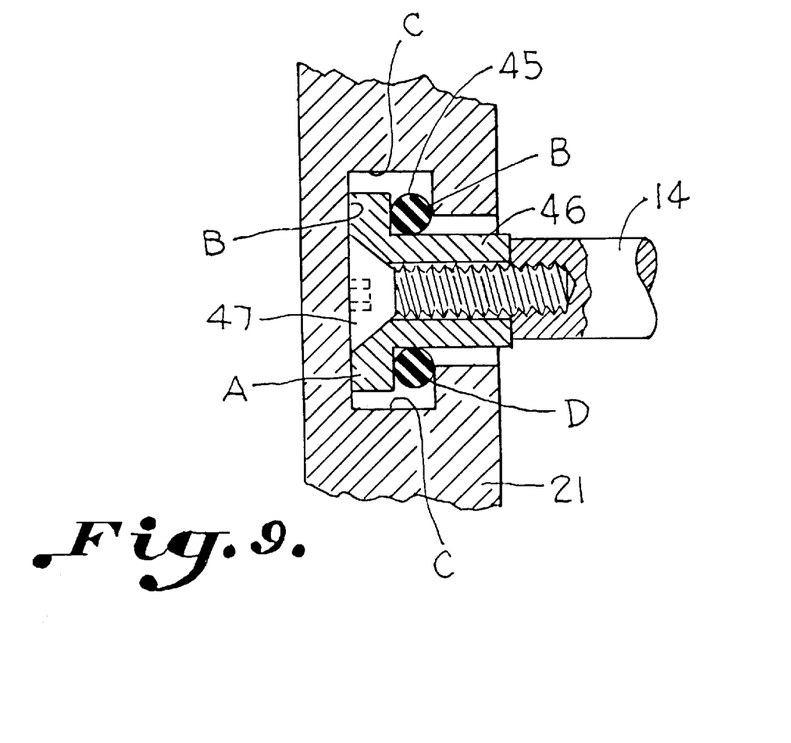
FIG. 9 is a sectional elevation illustrating a modified form of the invention utilizing a single O-ring carried in a groove on an end of the coupler adjacent the piston rod.

FIG. 9 illustrates another modified form of the invention wherein a single retaining member D is illustrated in the form of an O-ring 45 in a groove formed by an inner end surface of the coupler A and a collar 46. A threaded fastener 47 joins the coupler A at a free end of the piston rod 14.

Figure 10:
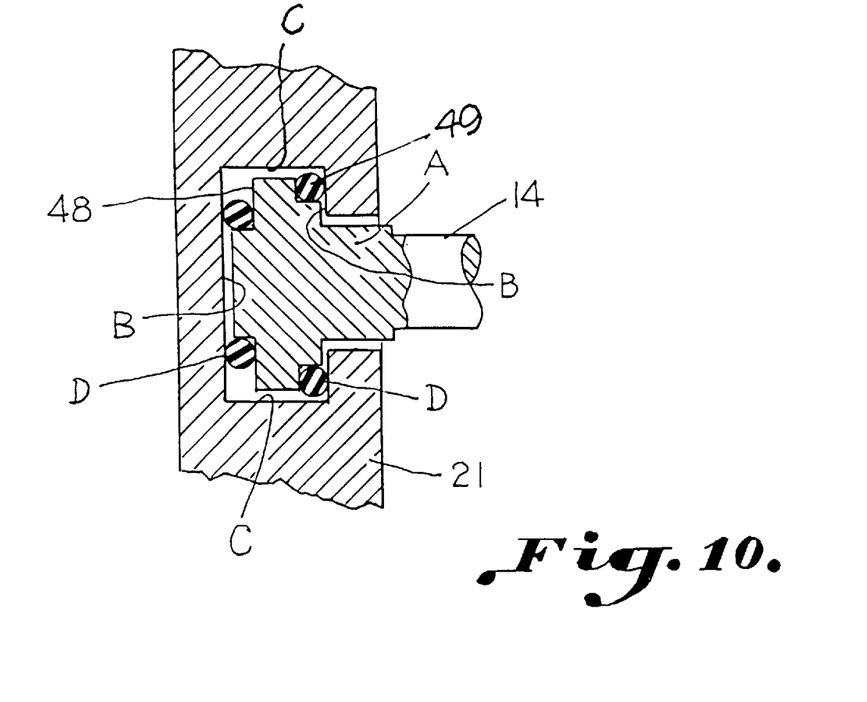
FIG. 10 is a sectional elevation illustrating a modified form of the invention wherein O-rings are carried in grooves at respective ends of the coupler.

FIG. 10 illustrates a coupling wherein a pair of opposed retaining members D are spaced at each end of the coupler A. The retaining members are illustrated at being in the form of O-rings constructed of rubbery material and are carried in external grooves 48 and 49, respectively, of the coupler A.

Figure 11:
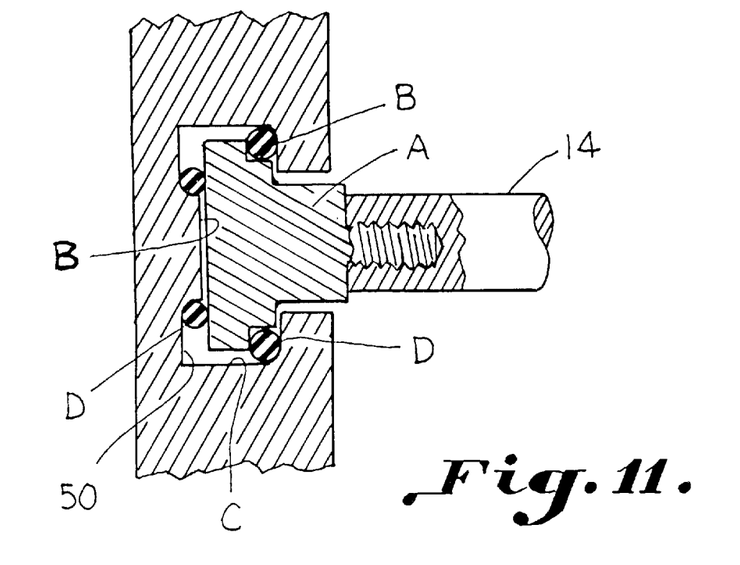
FIG. 11 is a sectional elevation illustrating a modified form of the invention wherein a groove is contained in a recess or receptacle for positioning the O-ring.

FIG. 11 illustrates a modified form of the invention wherein a groove 50 is formed within a rear wall B for containing an O-ring D.

Figure 12:
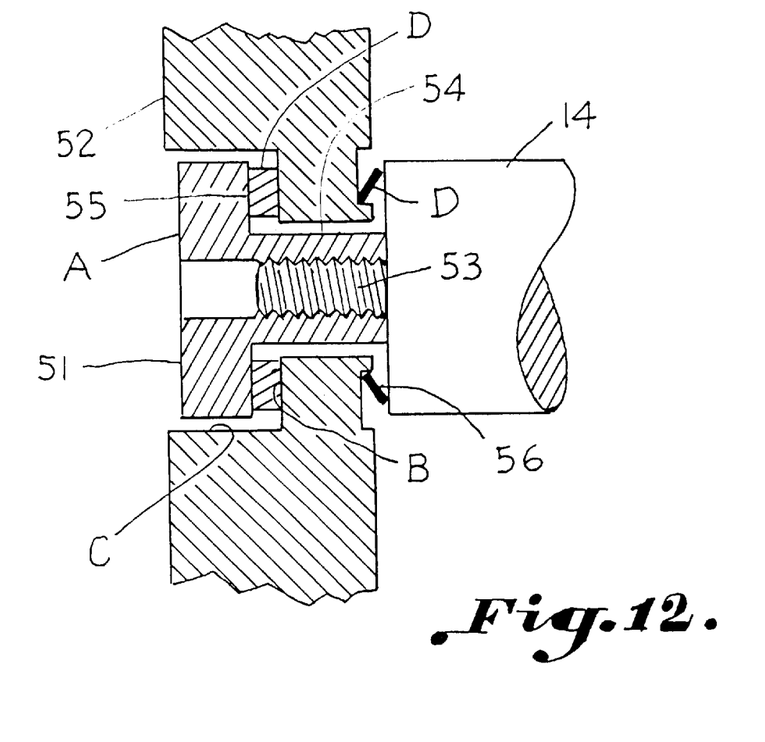
FIG. 12 is a sectional elevation illustrating a modified form of the invention wherein a receptacle is provided in a rear surface of the actuated member for receiving the enlarged coupler wherein a flat washer is provided between the coupler and a wall of the receptacle which a Bellville washer is provided between an interior surface of the actuated member and an enlarged portion of the shaft or the extensive member of the linear actuator.

FIG. 12 illustrates a recess 51 within a rear wall 52 of the actuated member for containing the enlarged coupler A. A transverse surface defined by a wall B permits limited axial adjustment of the coupling. A circumferential wall C provides for radial adjustment. A piston rod 14 has a threaded end 53 for connection to a reduced portion 54 of the coupler A. A flat washer is illustrated at 55 while a Bellville washer 56 provides a complementary resilient force providing floating alignment for the enlarged coupler A.

Figure 13:
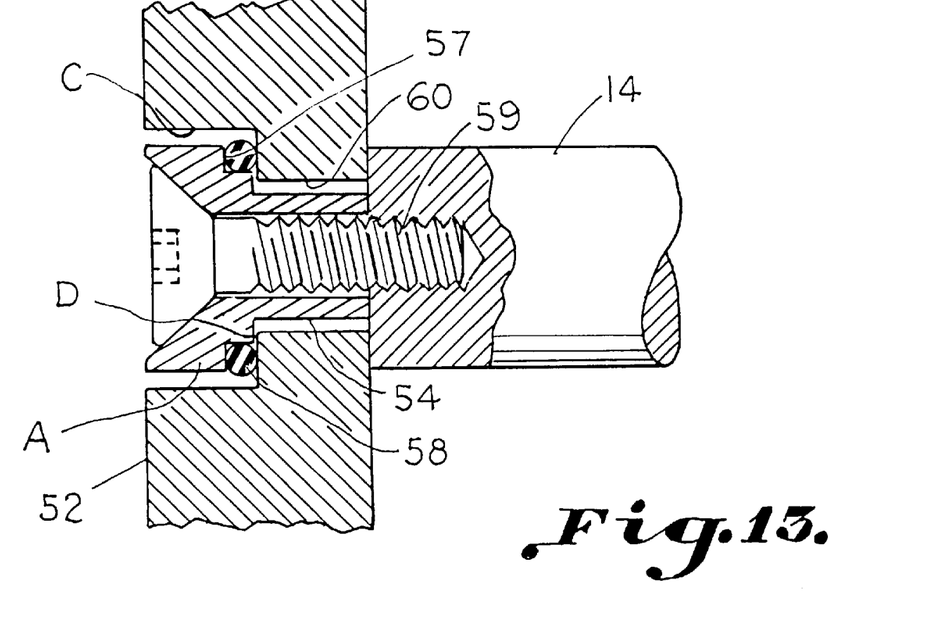
FIG. 13 is a sectional elevation illustrating a modified form of the invention wherein a receptacle in a rear surface of the actuated member is provided with an insert or retaining member in the form of an O-ring and a metallic collar is provided on the extensible shaft of the linear actuator for confining a wall portion of the actuated member therebetween thus coupling the actuated member to the extensible member in floating alignment for axial and radial adjustment.

FIG. 13 illustrates a recess forming a receptacle in a rear wall 52 of the actuated member for receiving the coupler A which is provided with an internal groove 57 for containing an O-ring 58. A threaded fastener 59 secured the enlarged coupler to the extensible member 14. A passageway extension 60 is formed as in FIG. 12 for accommodating the reduced portion 54 of the coupling A.

Figure 14:
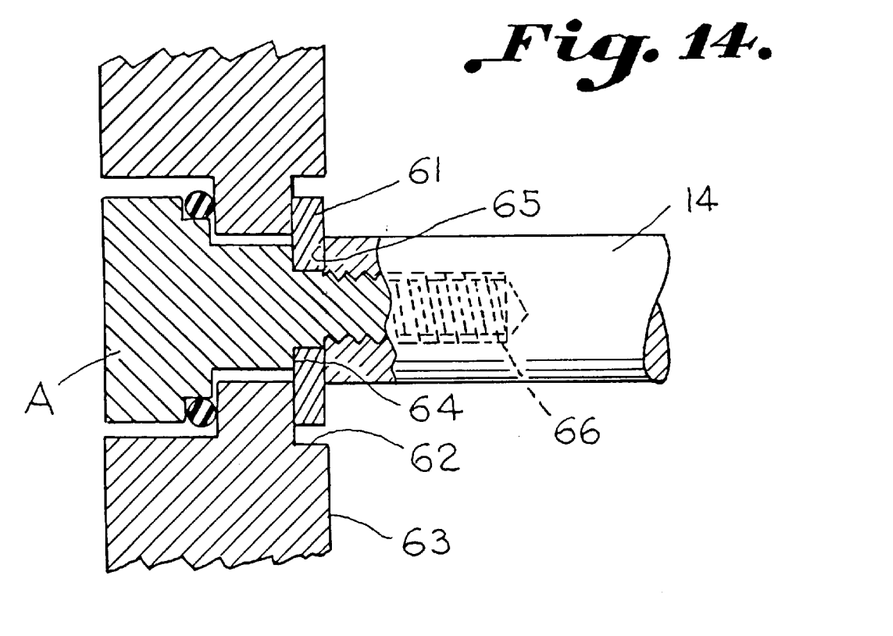
FIG. 14 is a sectional elevation illustrating another modified form of the invention wherein an enlarged coupler is contained in a rear end wall providing an O-ring carried within a groove in an inner end of an enlarged coupler which is secured by a threaded fastener to the extensible member.

FIG. 14 is a sectional elevation illustrating a modified form of the invention wherein a metallic ring 61 is contained within a groove 62 formed in an internal wall 63 of the actuated member. The metallic ring 61 is confined between a shoulder 64 and an end 65 of the piston rod 14. A threaded portion of the coupling A is illustrated at 66 for reception within the piston rod 14.

Figure 15:
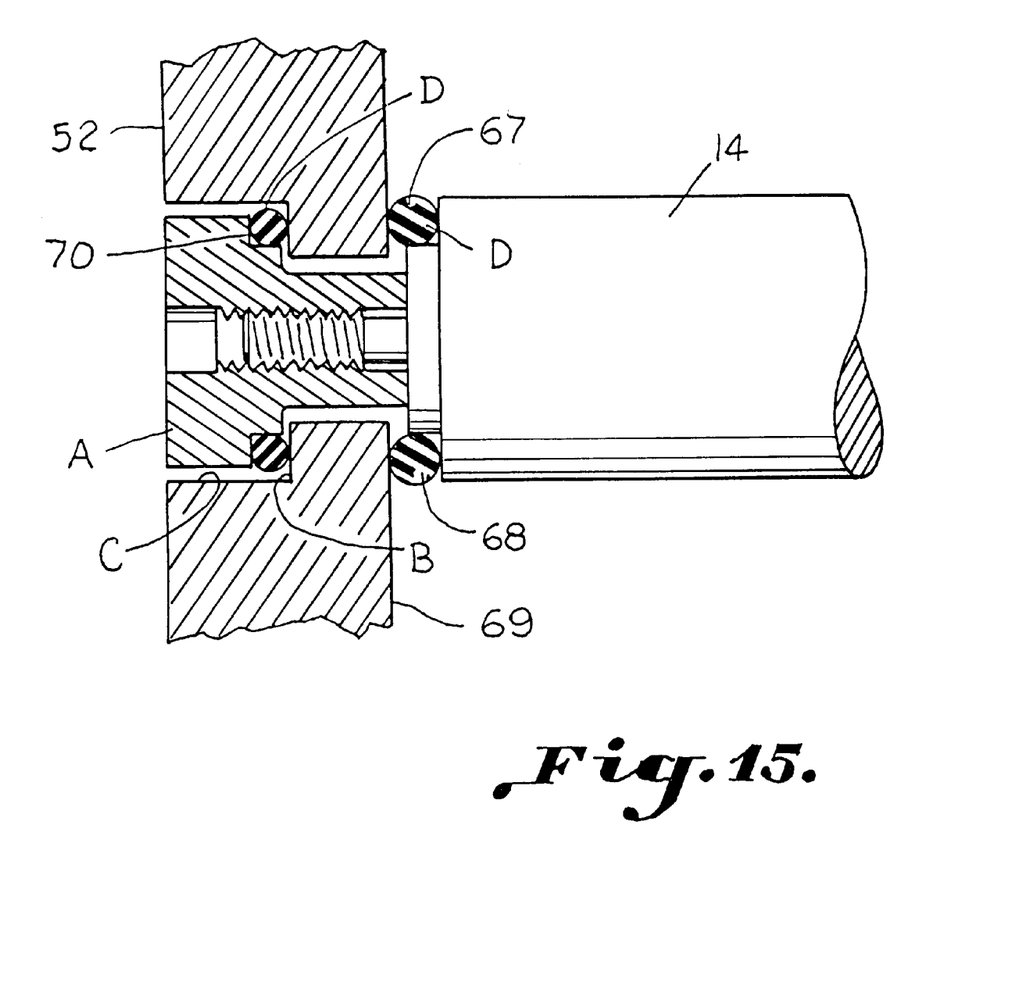
FIG. 15 is a sectional elevation illustrating another modified form of the invention similar to FIG. 14 wherein a threaded end portion of the extensible member is received within the enlarged coupler and providing an O-ring within a slot and the rear wall of the actuated member with a complementary O-ring within a groove in an adjacent end of the extensible member confined between the extensible member and the actuated member for further facilitating a floating alignment.

FIG. 15 is a sectional elevation illustrating a modified form of the invention wherein an O-ring 67 is confined between an end 68 of the piston rod 14 and an inner wall 69 of the actuated member for providing a complementary compressive action to that afforded by an O-ring 70 carried at an inner end of the coupler A to facilitate the floating coupling.

The recess in the rear wall 52 of the actuated member as illustrated in FIGS. 12–15 provides an advantage in permitting further miniaturization resulting from further shortening of the coupling. This advantage may be offset where the extensible member or shaft is very small because strength requirements would limit usefulness of this embodiment. This is because the shaft at its end must be reduced for confining the coupler within the receptacle provided in the rear wall 52.

While a preferred embodiment of the invention has been described using specific terms, such description is for illustrative purposes only, and it is to be understood that changes and variations may be made without departing from the spirit or scope of the following claims.

What is claimed is:

1. The method of joining and aligning an extensible member to an aligned member moved responsive thereto comprising the steps of:

provid­ing a fluid actuated extensible piston rod extending from a cylinder;

utilizing a coupler attached in transverse relation to the piston rod;

providing at least one retaining member for positioning and exerting a force between the coupler and the aligned member;

inserting the coupler and the retaining member into a passageway opening into the aligned member so that the piston rod is substantially aligned therewith with the retaining member therebetween;

aligning the coupler and the retaining member in a receptacle extending in alignment with the passageway for floating axial and radial adjustment therein; and positioning the cylinder to exert a force between the piston rod and the aligned member.

2. The method of joining and aligning set forth in claim 1 wherein the retaining member is an O-ring, and including the step of positioning the O-ring in a groove in the coupler before insertion into the passageway.

3. The method of joining and aligning set forth in claim 1 including the step of utilizing said piston rod in longitudinal alignment with said aligned member for moving an external load.

4. The method of joining and aligning set forth in claim 3 wherein said piston rod is pneumatically actuated extending from a cylinder and securing the cylinder to a fixed mounting member.

5. The method of joining and aligning set forth in claim 4 including the step of threadably securing said coupler to a free end of said piston rod.

6. The method of joining and aligning an extensible member to an aligned member moved responsive thereto comprising the steps of:
   providing a fluid actuated extensible piston rod extending from a cylinder;
   utilizing an arcuate coupler attached in transverse relation to the piston rod;
   providing at least one retaining member for positioning and exerting a force between the coupler and the aligned member;
   inserting the arcuate coupler and the retaining member into a passageway opening into the aligned member so that the piston rod is substantially normal thereto with the retaining member therebetween;
   aligning the arcuate coupler and the retaining member in a slot forming a receptacle extending in alignment with the transverse passage for floating axial and radial adjustment therein; and
   positioning the cylinder to exert a force between the piston rod and the aligned member.

7. The method of joining and aligning set forth in claim 6 wherein the retaining member is an O-ring, and including the step of positioning the O-ring in a groove in the coupler before insertion into the transverse passageway.

8. The method of joining and aligning set forth in claim 6 wherein said piston rod is pneumatically actuated extending from a cylinder and securing the cylinder to a fixed mounting member.

9. The method of joining and aligning an extensible member to an aligned member moved responsive thereto comprising the steps of:
   providing a fluid actuated extensible piston rod extending from a cylinder;
   utilizing a coupler attached in transverse relation to the piston rod;
   providing at least one retaining member for positioning and exerting a force between the coupler and the aligned member;
   inserting the coupler and the retaining member into a passageway opening into a rear wall of the aligned member so that the piston rod is substantially normal thereto with the retaining member therebetween;
   aligning the coupler and the retaining member in a slot extending in alignment with the transverse passage for floating axial and radial adjustment therein; and
   positioning the cylinder to exert a force between the piston rod and the aligned member.

10. The method of joining and aligning set forth in claim 9 including the step of utilizing said piston rod in longitudinal alignment with said aligned member for moving an external load.

11. The method of joining and aligning set forth in claim 10 wherein said piston rod is pneumatically actuated extending from a cylinder and securing the cylinder to a fixed mounting member.

12. The method of joining and aligning set forth in claim 11 including the step of threadably securing said coupler to a free end of said piston rod.

13. The method of joining and aligning an extensible member to an aligned member moved responsive thereto comprising the steps of:
   providing a power operated extensible rod extending from a housing containing a source of power;
   utilizing a coupler attached in transverse relation to the extensible rod;
   providing at least one retaining member for positioning and exerting a force between the coupler and the aligned member;
   inserting the coupler and the retaining member into a passageway opening into the aligned member so that the rod is substantially aligned therewith with the retaining member therebetween;
   aligning the coupler and the retaining member in a receptacle extending in alignment with the passageway for floating axial and radial adjustment therein; and
   positioning the housing to exert a force between the rod and the aligned member.

* * * * *